United States Patent
Kvernvik et al.

(10) Patent No.: US 12,316,508 B2
(45) Date of Patent: May 27, 2025

(54) METHOD AND SYSTEM FOR FILTERING OF ABNORMAL NETWORK PARAMETER VALUES PRIOR TO BEING USED IN TRAINING OF A PREDICTION MODEL IN A COMMUNICATION NETWORK

(71) Applicant: Telefonaktiebolaget LM Ericsson (publ), Stockholm (SE)

(72) Inventors: Tor Kvernvik, Täby (SE); Tony Larsson, Upplands Väsby (SE); Jaeseong Jeong, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 959 days.

(21) Appl. No.: 17/430,384

(22) PCT Filed: Feb. 25, 2019

(86) PCT No.: PCT/EP2019/054610
§ 371 (c)(1),
(2) Date: Aug. 12, 2021

(87) PCT Pub. No.: WO2020/173542
PCT Pub. Date: Sep. 3, 2020

(65) Prior Publication Data
US 2022/0174511 A1    Jun. 2, 2022

(51) Int. Cl.
*H04L 41/147* (2022.01)
*G06N 20/00* (2019.01)
(Continued)

(52) U.S. Cl.
CPC .......... *H04L 41/147* (2013.01); *G06N 20/00* (2019.01); *H04B 17/318* (2015.01);
(Continued)

(58) Field of Classification Search
None
See application file for complete search history.

(56) References Cited

U.S. PATENT DOCUMENTS

2015/0373565 A1* 12/2015 Safavi ................. H04L 41/5067
                                                      370/252
2016/0028750 A1   1/2016 Di Pietro et al.
(Continued)

OTHER PUBLICATIONS

International Search Report and Written Opinion of the International Searching Authority for PCT International Application No. PCT/EP2019/054610 dated Oct. 22, 2019.
(Continued)

*Primary Examiner* — Srinivasa R Reddivalam
(74) *Attorney, Agent, or Firm* — Sage Patent Group

(57) ABSTRACT

A method and system of filtering abnormal network parameter values are described. A network node receives first values of first network parameters that are not trusted by the network node. The network node determines, based on an expected correlation between the first values of the first network parameters and second values of second network parameters, whether the first values of the first network parameters are anomalies. Responsive to determining that the first values of the first network parameters are not anomalies, the network node causes the first values to be used as input to train a network prediction model that is used for optimization of traffic in the network, and responsive to determining that the first values of the first network parameters are anomalies, the network node causes the first values to not be used to train the network prediction model.

20 Claims, 9 Drawing Sheets

(51) Int. Cl.
*H04B 17/318* (2015.01)
*H04W 24/02* (2009.01)
*H04W 24/08* (2009.01)
*H04W 28/06* (2009.01)

(52) U.S. Cl.
CPC .......... *H04W 24/02* (2013.01); *H04W 24/08* (2013.01); *H04W 28/06* (2013.01)

(56) References Cited

U.S. PATENT DOCUMENTS

| | | | | |
|---|---|---|---|---|
| 2018/0052726 | A1* | 2/2018 | Yoshida | G05B 23/0254 |
| 2018/0191763 | A1* | 7/2018 | Hillard | H04L 63/1416 |
| 2019/0342195 | A1* | 11/2019 | Mermoud | G06N 3/049 |
| 2020/0065212 | A1* | 2/2020 | Chanda | H04L 41/142 |
| 2020/0126037 | A1* | 4/2020 | Tatituri | G06N 20/00 |

OTHER PUBLICATIONS

Boutaba et al., "A comprehensive survey on machine learning for networking: evolution, applications and research opportunities," Journal of Internet Services and Applications, vol. 9, No. 1, Jun. 21, 2018, 99 pages.

\* cited by examiner

```
┌─────────────────────────────────────────────────────────────────────────┐
│  DETERMINE BASED ON AN EXPECTED CORRELATION BETWEEN THE FIRST VALUES OF THE FIRST │
│    NETWORK PARAMETERS AND ONE OR MORE SECOND VALUES OF ONE OR MORE SECOND        │
│  NETWORK PARAMETERS, WHETHER THE FIRST VALUES OF THE FIRST NETWORK PARAMETERS ARE │
│    ANOMALIES, WHERE THE SECOND NETWORK PARAMETERS ARE TRUSTED BY THE NETWORK     │
│                                    DEVICE                                         │
│                                     204                                           │
│                                                                                   │
│   ┌───────────────────────────────────────────────────────────────────────┐      │
│   │  OBTAIN BASED ON ONE OR MORE ANOMALY DETECTION MECHANISMS A RESPECTIVE │      │
│   │   ONE OF ONE OR MORE ANOMALY INDICATIONS FOR THE FIRST VALUES, WHERE EACH │   │
│   │    ONE OF THE ANOMALY INDICATIONS INDICATES WHETHER THE FIRST VALUES ARE │    │
│   │    ANOMALIES ACCORDING TO THE RESPECTIVE ANOMALY DETECTION MECHANISM    │      │
│   │                                  224                                    │      │
│   └───────────────────────────────────────────────────────────────────────┘      │
│                                     │                                             │
│                                     ▼                                             │
│   ┌───────────────────────────────────────────────────────────────────────┐      │
│   │     DETERMINE BASED ON THE ONE OR MORE ANOMALY INDICATIONS WHETHER THE│      │
│   │                      FIRST VALUES ARE ANOMALIES                        │      │
│   │                                  226                                   │      │
│   │                                                                        │      │
│   │   ┌───────────────────────────────────────────────────────────────┐   │      │
│   │   │    WHERE TO DETERMINE THAT THE FIRST VALUES ARE ANOMALIES    │   │      │
│   │   │    INCLUDES TO DETERMINE THAT AT LEAST ONE OF THE ANOMALY    │   │      │
│   │   │ INDICATIONS INDICATES THAT THE FIRST VALUES ARE ANOMALIES, AND│   │      │
│   │   │ WHERE TO DETERMINE TO DETERMINE THAT THE FIRST VALUES ARE NOT │   │      │
│   │   │    ANOMALIES INCLUDES TO DETERMINE THAT NONE OF THE ANOMALY  │   │      │
│   │   │    INDICATIONS INDICATES THAT THE FIRST VALUES ARE ANOMALIES │   │      │
│   │   │                              228                              │   │      │
│   │   └───────────────────────────────────────────────────────────────┘   │      │
│   │                                                                        │      │
│   │   ┌───────────────────────────────────────────────────────────────┐   │      │
│   │   │    WHERE TO DETERMINE THAT THE FIRST VALUES ARE ANOMALIES    │   │      │
│   │   │   INCLUDES TO DETERMINE THAT ALL OF THE ANOMALY INDICATIONS  │   │      │
│   │   │  INDICATE THAT THE FIRST VALUES ARE ANOMALIES, AND WHERE TO TO│   │      │
│   │   │   DETERMINE THAT THE FIRST VALUES ARE NOT ANOMALIES INCLUDES │   │      │
│   │   │    DETERMINING THAT AT LEAST ONE OF THE ANOMALY INDICATIONS  │   │      │
│   │   │       INDICATES THAT THE FIRST VALUES ARE NOT ANOMALIES       │   │      │
│   │   │                              230                              │   │      │
│   │   └───────────────────────────────────────────────────────────────┘   │      │
│   └───────────────────────────────────────────────────────────────────────┘      │
└─────────────────────────────────────────────────────────────────────────┘
```

FIG. 2B

METHOD AND SYSTEM FOR FILTERING OF ABNORMAL NETWORK PARAMETER VALUES PRIOR TO BEING USED IN TRAINING OF A PREDICTION MODEL IN A COMMUNICATION NETWORK

CROSS REFERENCE TO RELATED APPLICATION

This application is a 35 U.S.C. § 371 national stage application of PCT International Application No. PCT/EP2019/054610 filed on Feb. 25, 2019, the disclosure and content of which is incorporated by reference herein in its entirety.

TECHNICAL FIELD

The present disclosure relates to the field of network communication; and more specifically, to filtering abnormal network parameter values prior to being used in training of a prediction model in a communication network.

BACKGROUND

Prediction models (also referred to as machine learning model) result from providing a prediction algorithm (that is, the learning algorithm) with training data to learn from. Once trained, a prediction model can be used to get predictions on new data for which the output is unknown.

Prediction models can be used in communication networks to enhance network performance and optimize the traffic within the network. Machine learning (e.g., online learning, batch learning) can be used to train a network prediction model. Machine learning techniques rely on values of network parameters continuously received in the network to train the network prediction model. However, to enable an accurate training of a network prediction model there is a need to ensure that values used during the training process correspond to standard, expected values of parameters in a given network environment and do not represent an anomaly that instead deviates from the standard and expected values.

For example, there is a risk that values received from a malicious or misconfigured communication device can be included in the online training mechanism of the network prediction model and used to update the model. The use of these erroneous or corrupted values is likely to have a negative effect on the prediction model. For example, the use of the erroneous or corrupted values during the training of the prediction model can cause the prediction model to provide inaccurate predictions for other communication devices or network nodes that use this model even if these other devices are not malicious or mis-configured.

SUMMARY

The following description describes methods and apparatus for filtering abnormal network parameter values prior to using values considered uncorrupted in training of a prediction model in a communication network.

One general aspect includes a method in a network node in a communication network, the method including: receiving, from a communication device, one or more first values of one or more first network parameters, where the first network parameters are not trusted by the network node; determining, based on an expected correlation between the first values of the first network parameters and one or more second values of one or more second network parameters, whether the first values of the first network parameters are anomalies, where the second network parameters are trusted by the network node; responsive to determining that the first values of the first network parameters are not anomalies, causing the first values to be used as an input to train a network prediction model that is used for optimization of traffic in the communication network; and responsive to determining that the first values of the first network parameters are anomalies, causing the first values to not be used to train the network prediction model. Other embodiments of this aspect include corresponding computer systems, apparatus, and computer programs recorded on one or more computer storage devices, each configured to perform the actions of the methods.

One general aspect includes a network node in a communication network including: one or more processors, and a computer memory storing a set of computer readable instructions that when executed by the one or more processors cause the network node to: receive, from a communication device, one or more first values of one or more first network parameters, where the first network parameters are not trusted by the network node; determine, based on an expected correlation between the first values of the first network parameters and one or more second values of one or more second network parameters, whether the first values of the first network parameters are anomalies, where the second network parameters are trusted by the network node. The network node is further to, responsive to determining that the first values of the first network parameters are not anomalies, cause the first values to be used as an input to train a network prediction model that is used for optimization of traffic in the communication network; and responsive to determining that the first values of the first network parameters are anomalies, cause the first values to not be used to train the network prediction model.

One general aspect includes a network node in a communication network including: a receiving module that is configured to receive, from a communication device, one or more first values of one or more first network parameters, where the first network parameters are not trusted by the network node. The network node further includes a training data determiner module that is configured to determine, based on an expected correlation between the first values of the first network parameters and one or more second values of one or more second network parameters, whether the first values of the first network parameters are anomalies, where the second network parameters are trusted by the network node; responsive to determining that the first values of the first network parameters are not anomalies, cause the first values to be used as an input to train a network prediction model that is used for optimization of traffic in the communication network; and responsive to determining that the first values of the first network parameters are anomalies, cause the first values to not be used to train the network prediction model.

BRIEF DESCRIPTION OF THE DRAWINGS

The inventive concept may best be understood by referring to the following description and accompanying drawings that are used to illustrate embodiments of the inventive concept. In the drawings:

FIG. 2B illustrates a flow diagram of exemplary operations for determining whether first values of first network parameters are anomalies, in accordance with some embodiments.

DETAILED DESCRIPTION

Figure 1A:
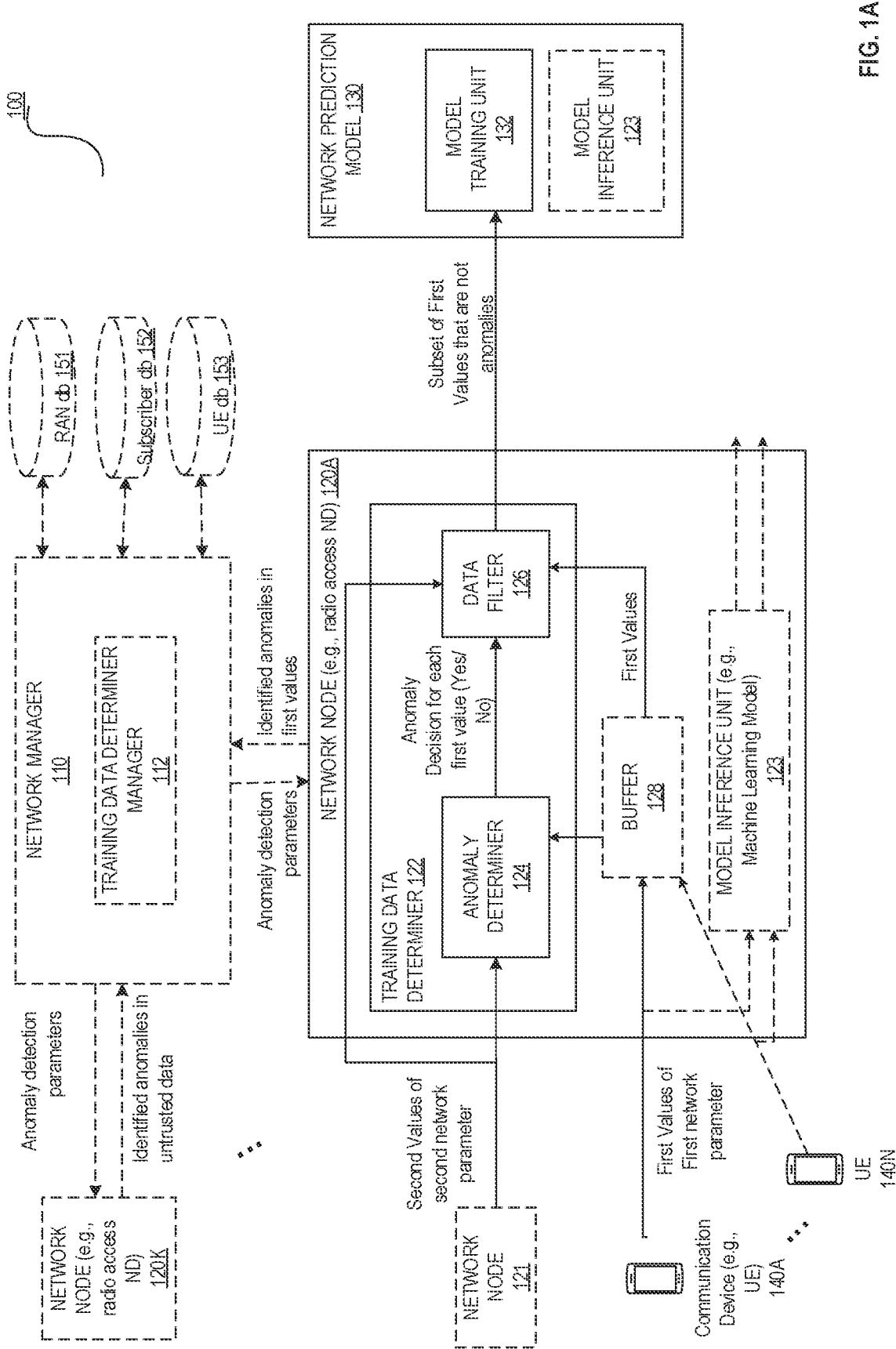
FIG. 1A illustrates a block diagram of an exemplary network in which filtering of abnormal network parameter values is performed prior to values considered normal being used in training of a prediction model in a communication network, in accordance with some embodiments.

The following description describes methods and apparatus for filtering abnormal network parameter values prior to using values considered uncorrupted in training of a prediction model in a communication network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the present disclosure may be practiced without such specific details. In other instances, control structures, gate level circuits and full software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the inventive concept. However, such notation should not be taken to mean that these are the only options or optional operations, and/or that blocks with solid borders are not optional in certain embodiments of the inventive concept.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Prediction models can be used in communication networks to enhance network performance and optimize the traffic within the network. Machine learning can be used to train a network prediction model. Machine learning techniques rely on values of network parameters continuously received in the network to train the network prediction model. However, to enable an accurate training of a network prediction model there is a need to ensure that values used during the training process correspond to standard, expected values of parameters in a given network environment and do not represent an anomaly that instead deviates from the standard and expected values.

For example, there is a risk that values received from a malicious or mis-configured communication device can be included in the online training mechanism of the network prediction model and used to update the model. The use of these erroneous or corrupted values is likely to have a negative effect on the prediction model. For example, the use of the erroneous or corrupted values during the training of the prediction model can cause the prediction model to provide inaccurate predictions for other communication devices or network nodes that use this model even if these other devices are not malicious or mis-configured.

The embodiments described herein present a system and a method for filtering abnormal network parameter values prior to being used in training of a prediction model in a communication network. The abnormal values can be corrupted values or erroneous values that are not trusted by the network node receiving them. The abnormal values can also provide from malicious network nodes. In one embodiment, a network node of a communication network receives, from another network node, one or more first values of one or more first network parameters. The first network parameters are not trusted by the network node. The network node determines, based on an expected correlation between the first values of the first network parameters and one or more second values of one or more second network parameters, whether the first values of the first network parameters are anomalies. The second network parameters are trusted by the network node. Responsive to determining that the first values of the first network parameters are not anomalies, the network node causes the first values to be used as an input to train a network prediction model that is used for optimization of traffic in the communication network, and responsive to determining that the first values of the first network parameters are anomalies, the network node causes the first values to not be used to train the network prediction model.

Thus, the embodiments described herein prevent the use of abnormal values, such as corrupted values or erroneous values, during an online training phase of a network prediction model. The described embodiments present several advantages when compared with other mechanisms of training of prediction models. The solution presented herein filters values received as input from malicious network nodes or misconfigured network nodes by determining whether the values are anomalies based at least in part on an expected correlation between trusted values and the input values. The mechanisms presented herein cause the prediction model to avoid being altered or corrupted by abnormal training values. The embodiments herein use knowledge of trusted data from the network and correlations between these trusted data and untrusted data to filter the data to use during the learning phase of the prediction model. The enclosed embodiments can be integrated in a network to enable an operator to identify malicious or defective behaviour of network nodes and take action accordingly. For example, the mechanisms described herein can be used in any type or wireless or wired communication networks. The embodiments herein enable an accurate and continuous training (e.g., online training or batch training) of a network prediction model based on reliable training data. In one exemplary scenario, the mechanisms described herein can be used during online learning in a radio access network.

FIG. 1A illustrates a block diagram of an exemplary network in which filtering of abnormal network parameter values is performed prior to normal values being used in training of a prediction model in a communication network, in accordance with some embodiments.

Although the subject matter described herein may be implemented in any appropriate type of networking system using any suitable components, the embodiments disclosed herein are described in relation to a wireless network, such as the example wireless network 100 illustrated in FIG. 1A. For simplicity, the network 100 only depicts the following components: a network manager 110, one or more network nodes 120A-K, network node 121, one or more communication devices 140A-N, and a network prediction model 130. In practice, a wireless network may further include any additional elements suitable to support communication between wireless devices or between a wireless device and another communication device, such as a landline telephone, a service provider, or any other network node or end device. The wireless network may provide communication and other types of services to one or more wireless devices to facilitate the wireless devices' access to and/or use of the services provided by, or via, the wireless network.

The wireless network 100 may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 100 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

In different embodiments, the wireless network 100 may comprise any number of wired or wireless networks, base stations, controllers, wireless devices, relay stations, and/or any other components or systems that may facilitate or participate in the communication of data and/or signals whether via wired or wireless connections.

As used herein, a network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a wireless device with access to the wireless network or to provide some service to a wireless device that has accessed the wireless network.

The network node 120A is operative to receive first values of a first network parameter, where the first values are not trusted by the network node 120A and receive second values of a second network parameter that are trusted. The second network parameters are trusted by the network node 120A. As opposed to the first network parameters which are not trusted and can have erroneous or corrupted first values, the second network parameters are trusted by the network node 120A. The second values of the second network parameters can provide from another network node that is different from the network node 120A (e.g., network node 121). Alternatively, the second values of the second network parameters can be determined by the network node 120A. In a non-limiting example, the second network parameters include one or more of a timing advance parameter that represents a length of time a signal takes to reach the radio access network node from the communication device through a radio channel between the communication device and the radio access network node, an estimation of path loss for the radio channel, and measures of activity of neighbor cells. In some embodiments, the first values and/or the second values can be time series.

The network node 120A is then operative to determine whether the first values are anomalies and based on this determination, the network node 120 is operative to transmit or not the first values to the network prediction model 130 to be used during a training phase of the prediction model.

The network manager 110 is a network node that is operative to perform functionalities to support management of the different components of the network 100. In some embodiments, the network manager 110 can be part of the operation support system (OSS). For example, the network manager 110 is operative to perform operations such as network inventory, service provisioning, network configuration and fault management. Further the network manager 110 is operative to receive first values of network parameters that are identified as anomalies and determine based on this information anomaly detection parameters for configuring one or more anomaly detection mechanisms in one or more network nodes of the network 100. For example, the network manager 110 may include a training data determiner manager 112 that is operative to receive identified anomalies in first values from the network node 120A and determine anomaly detection parameters for configuring the training data determiner 122 of the network node 120A. In some embodiments, the training data determiner manager 112 may further receive identified anomalies from one or more additional network node (e.g., 120K) and use these identified anomalies in addition to the data received from the network node 120A and/or from the communication devices (e.g., communication devices 140A-K) to determine the anomaly detection parameters. As will be described in further details below the training data determiner manager 112 may determine one or more network nodes from the network 100 that are to receive anomaly detection parameters following the analysis of identified anomalies from one or multiple network nodes in the network.

The network manager 110 may be connected to one or more databases or repositories such as the Radio Access Network (RAN) database 151, the subscriber database 152, and the UE database 153. These databases allow the network manager 110 to obtain additional information related to the feedback or identified anomalies received from one or more network nodes 120A.

While the embodiments herein will be described with the network manager 110 receiving feedback regarding first values identified as anomalies, in some embodiments, the network manager 110 may also receive feedback information regarding first values that are not identified as anomalies. Thus, in these alternative embodiments, the network manager 110 may use the feedback regarding abnormal first values as well as normal first values to determine and set the anomaly detection parameters.

The communication devices 140A-N are wireless devices that are operative to transmit values of one or more network parameters to the network node 120A. In some embodiments, the communication devices 140A-N can transmit values of a single network parameter (e.g., first values of a first network parameter). In one non-limiting example, the first network parameter can be an indicator of quality of a radio channel between the communication device and the radio access network node such as e.g., the Channel Quality Indicator (CQI). Other network parameters can be transmitted from the communication devices 140A-N. In some embodiments, each one of the communication devices 140A-N can transmit values of multiple network parameters. The values of the network parameters are not trusted by the network node 120A and more generally by any network node that is to transmit these values to the network prediction model 130. The values can include erroneous values or corrupted values that can negatively impact the network prediction model 130 if used during the training phase of the network prediction model 130. The erroneous or corrupted values can be a result of a malicious communication device that is intentionally attempting to corrupt the network 100, a communication device that is subject to a malicious attack, or a defective communication device or defective channel between the communication device and the network node, that cause the values to be considered as abnormal values and not suitable for being used during a training phase of the prediction model 130.

In some embodiments, the network node 120A includes a buffer 128 that is used to temporarily store first values of first network parameters received in the network node 120A. The buffer 128 is operative to store the first values received and transmit a sample of these values to the data filter 126 and the anomaly determiner 124. For example, the first values of the first parameters can be sampled every N ms (e.g., 100 ms) from first values received at the network node 120A from the communication device 140A.

The network node 120A includes a training data determiner 122 that is operative to receive first values of one or more first network parameters and determine whether to transmit or not the first values to the prediction model 130. The training data determiner 122 includes an anomaly determiner 124 that is operative to determine whether a first value of a first network parameters is an anomaly or not and is operative to output one or multiple anomaly indications for the first value indicating whether the first value is an anomaly or not. The training data determiner 122 also includes a data filter 126 that is operative to receive one or more anomaly indication for a first value and determine whether to transmit or not the first value to the prediction model 130. The operations of the training data determiner 122 will be described in more details with reference to FIG. 1B.

The network 100 also includes a network prediction model 130. Unless otherwise noted, the term network prediction model may be used interchangeably herein with the term prediction model. The prediction model 130 includes a model training unit 132 and an optional model inference unit 123. The model training unit 132 receives values of network parameters to learn during a training phase. Once the prediction model is trained, the model inference unit 123 can be used to get predictions on new data for which the output is unknown. While illustrated as two separate units (132 and 123), the model training unit 132 and the model inference unit 123 can be implemented as a single component used differently at different moments. For example, in a first interval of time, the component is used to be trained and learn from values received, and in a second interval of time, the component is used to predict new outputs during an inference phase. Further in some embodiments, the model inference unit 123 can be located within the network node 120A (e.g., a copy of the model inference unit 123 is stored in the network node 120A) and used for prediction. Alternatively, the model inference unit 123 is stored in a separate network node with the model training unit 132. In another embodiment, the inference unit 123 can be stored in another network node that is different from the network node 120A and different from the prediction model node 130.

In some embodiments, the prediction model 130 can be used in the communication network 100 to enhance network performance and optimize the traffic within the network. The prediction model 130 can also be used, alternatively or additionally, to enhance fault management in the network or for other types of optimization within the network 100. Machine learning (e.g., online learning or batch learning) can be used to continuously train the network prediction model 130. Learning techniques rely on values of network parameters continuously received in the network 100, e.g., received at the network node 120A, to train the model training unit 132. In one non-limiting example, a radio access ND may continuously update the prediction model 130 when new values of performance parameter are received. This can for instance take place every 100 ms or at any other frequency that is suitable depending on the application and type of prediction model.

In some embodiments, the prediction model 130 is implemented on one or more network nodes that are part of the network 100. While the illustrated FIG. 1A shows a single network node 120A from which values are transmitted to the prediction model 130, in some embodiments, the prediction model 130 may receive values of network parameters from multiple different network nodes of the network 100 and the model training unit 132 can use these values during the training phase. The model inference unit 123 can then be used to make predictions at one or more network nodes in the network 100.

In a non-limiting example, the prediction model 130 can be used to determine a Block Error Rate (BLER) based on one or more of the following network parameters: CQI that is obtained from the communication device 140A, Timing Advance determined in the network, path loss indicating the quality of the channel between the communication device 140A and the ND 120A, and neighbour cell activity. The BLER allows the network to transmit data with different transport block size and is used to optimize the channel quality between the network node 120A and the communication device 140A. Other examples of parameters can be predicted with other types of prediction models based on one or more parameters measured in the network and enable the optimization of the traffic in the network 100.

Figure 1B:
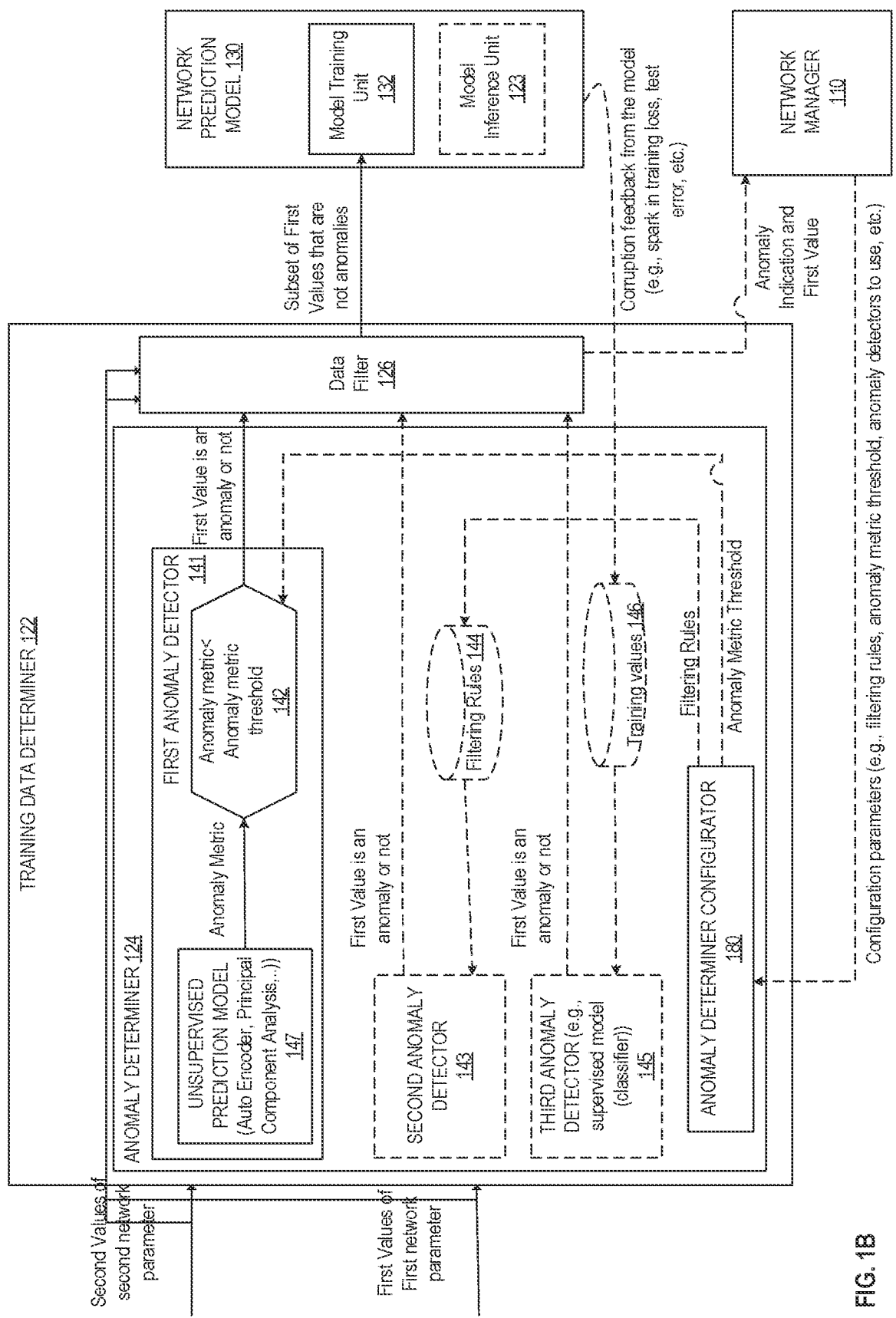
FIG. 1B illustrates a block diagram of an exemplary training data determiner that can be used for filtering corrupted network parameter values, in accordance with some embodiments.

FIG. 1B illustrates a block diagram of an exemplary training data determiner that can be used for filtering abnormal network parameter values, in accordance with some embodiments. As illustrated with reference to FIG. 1A, the training data determiner 122 can be included in a network node (e.g., 120A) that is in communication with one or more communication devices 140A-K. In some embodiments, the training data determiner 122 can be included in any other type of network nodes that is operative to receive untrusted data from other ones of network nodes of the network 100.

The training data determiner 122 includes an anomaly determiner 124 and a data filter 126. The anomaly determiner 124 includes an anomaly determiner configurator 180, a first anomaly detector 141, an optional second anomaly detector 143 and an optional third anomaly detector 145. Each one of the first anomaly detector 141, the second anomaly detector 143, and the third anomaly detector 145 implement a respective anomaly detection mechanism that can be used to obtain anomaly indications for the first values of a first network parameter.

Each one of the anomaly detectors is operative to receive the first values. The anomaly detectors may further receive the second values. For example, the first values of the first parameters can be samples extracted every N ms (e.g., 100 ms) from first values received at the network node 120A from the communication device (not shown). These samples are intended to be sent to the network prediction model 130 to be used during a training phase of the prediction model. The anomaly detectors are then operative to determine anomaly indications for the first values. The anomaly indication indicates whether a first value of a first parameter corresponds to an abnormal behavior that does not fit within an expected standard or normal behavior.

The anomaly determiner configurator 180 is operative to receive configuration parameters from the network manager 110 and configure the anomaly determiner 124 accordingly. For example, the anomaly determiner configurator 180 may update the training rules 146, the filtering rules 144, and the anomaly metric threshold in 142. In addition, the anomaly determiner configurator 180 may configure the anomaly determiner 124 to use one or multiple ones of the anomaly detectors 141, 143, and 145. In one embodiment, the anomaly determiner 124 may be configured such that only the first anomaly detector 141 is used to obtain an anomaly indication. In some other embodiments, the anomaly determiner 124 may be configured such that two anomaly detectors (e.g., 141 and 143 or 141 and 145, etc.) can each be used to determine respective anomaly indications for first values. In another embodiment, the anomaly determiner 124 may be configured such that all of the anomaly detectors are used to obtain respective anomaly indications. While the anomaly determiner 124 is illustrated as having three anomaly detectors in other embodiments, less or more anomaly detectors can be present and can be used to obtain less or more anomaly indications for first values.

While the embodiments herein will be described with an anomaly indication obtained for a pair of first value of a first parameter and second value of a second parameter, in other embodiments different combinations of parameters can be used to obtain an indication of anomaly. For example, in one embodiment, the training data determiner 122 may receive values of multiple first network parameters that are not trusted by the network node 120A and values of multiple second network parameters that are trusted by the network node 120A. Based on the untrusted values and the trusted values the training data determiner 122 may determine whether to use the untrusted values in the training of the prediction model 130. In another embodiment, values of a single untrusted parameter can be evaluated based on values of multiple trusted parameters. In another embodiment, values of multiple untrusted parameters can be evaluated based on values of a single trusted parameter.

Each one of the anomaly detectors is operative to determine an anomaly indication for first values of first network parameters based on an expected correlation of the values of the first network parameters with values of second network parameters that are trusted. The anomaly indication can be an anomaly metric that is calculated based on the first values and the second values. The anomaly metric can be evaluated against a threshold value to determine whether the first values are anomalies. In other embodiments, the anomaly indication is a binary value that indicates whether the first values are anomalies or not. The expected correlation between values of a untrusted first parameter and values of trusted second network parameters can take several forms. For example, in a first embodiments, when there a first parameter and a second parameter are closely correlated (e.g., the first parameter always increases when the second parameter increases and vice versa) in the time domain. In this example, both the values of the first parameter and the values of the second parameter can be within the normal boundaries of an upper and a lower thresholds and not regarded as an anomaly by comparing the instant value of the first values and the second values. However, when evaluating the evolution of the first values and the second values over time, an anomaly can be detected by determining that the first values are increasing while the second values are decreasing. To capture this type of anomalies an anomaly detector can learn an expected correlation between the values of the first parameter and values of the second parameter in time domain by using input from time series of data from all parameters. In another example, instantaneous changes between a first value of a first parameter and a second value of a second network parameter can also be detected as an anomaly by an anomaly detector. As it will be discussed below, several types of anomaly detectors can be used to detect anomalies based on an expected correlation between first values and second values. The expected correlation can be an instantaneous correlation or alternatively a correlation evaluated over time. Further, while in some embodiments an anomaly detector is used to determine anomalies of first values based on expected correlation with second values, in some embodiments, an anomaly detector can detect anomalies of a first parameter based on an expected behavior of values of the first parameter independently of values of the second parameter.

In one embodiment, an anomaly indication can be obtained for a first value of a first network parameter based on a first anomaly detection mechanism. The first anomaly detection mechanism can be implemented in the first anomaly detector 141. The first anomaly detector 141 is operative to include a prediction model of unsupervised type, e.g., unsupervised prediction model 147. In a non-limiting example, the unsupervised prediction model 147 can be an auto encoder (AE) or a principal component analysis (PCA) projection-based detector.

The first anomaly detector 141 receives a first value of a first parameter. The unsupervised prediction model 147 determines using a first value of the first network parameter and a second value of the second network parameter as input, an anomaly metric for the first value. The first value is received from a communication device and the second value is received from a trusted network node. In some embodiments, the trusted network node is the node including the first anomaly detector. The second value is associated with the first value based one or more mechanisms (e.g., the time stamps of each one of the values, a cell identifier, and/or a communication device identifier transmitting the values). The determination of the anomaly metric for the first values is performed based on an expected correlation between the first values and the second values.

The first anomaly detector 141 then determines whether the anomaly metric determined for the first value is greater than an anomaly metric threshold. When the anomaly metric for the first value is greater than the anomaly metric threshold, the first anomaly detector 141 outputs a first anomaly indication indicating that the first value is an anomaly. When the anomaly metric for the first value is smaller than the anomaly metric threshold, the first anomaly detector 141 outputs a second anomaly indication indicating that the first values is not an anomaly. The determination that the first value is an anomaly is a result of a determination that the first value violates the expected correlation between the first value and its associated second value. The determination that the first value is not an anomaly is a result of a determination that the first value respects the expected correlation between the first value and its associated second value.

In one embodiment, the first anomaly detector 141 can be an autoencoder. The autoencoder may be tuned during a training phase to minimize the reconstruction error between the reconstructed and original input signals. After the training phase, an abnormally high reconstruction error occurs when the decoder is unable to accurately reconstruct the input signal. This is indicative of an input signal that does not follow the normal pattern or structure followed by the input signal from the training phase, and thus a potential anomaly in the data. An autoencoder can be used with an aggregated matrix of a second value of the second network parameter (trusted value) and an associated first value of the first network parameter (untrusted value) as input, and can output an anomaly metric for the first value. In Another embodiment, the first anomaly detector 141 can be a principal component analysis projection mechanism.

In one embodiment, the anomaly indications for the first values of the first parameters can be obtained based on a second anomaly detection mechanism. The second anomaly detection can be implemented in the second anomaly detector 143. The second anomaly detector 143 determines whether the first value of the first network parameters satisfies a set of filtering rules 144. The filtering rules 144 identify anomaly categories and are based on analysis of previous values of the first network parameters obtained through one or more network nodes in the communication network. Upon determining that the first value satisfies the filtering rules, the second anomaly detector 143 outputs an anomaly indication indicating that the first value is an anomaly. Upon determining that the first value does not satisfy the filtering rules, the second anomaly detector 143 outputs an anomaly indication indicating that the first value is not an anomaly.

In one embodiment, the anomaly indications for the first values can be obtained based on a third anomaly detection mechanism. The third anomaly detection can be implemented in the third anomaly detector 145. The third anomaly detector 145 determines whether the first value of the first network parameter is an anomaly based on a supervised machine learning model. The supervised machine learning model uses as input the first value of the first network parameter and an associated second value of the second network parameter. The second value is associated with the first value based one or more mechanisms (e.g., the time stamps of each one of the values, a cell identifier, and/or a communication device identifier transmitting the values). For example, the second anomaly detection mechanism can be a classifier that uses as input an aggregated matrix of first values that are not trusted and second values that are trusted and output an anomaly indication for the first values. In some embodiments, the third anomaly detector 145 is operative to receive corruption feedback from the network prediction model 130 that is stored as training values 146 and can be used to train the third anomaly detector 145. For example, the feedback can be a detection of a spark in training loss, a test error, etc. detected by the prediction model 130 and allows the continuous update of the supervised model used in the third anomaly detector 145. Upon determining that the first value is an anomaly, the anomaly detector 145 outputs an anomaly indication indicating that the first value is an anomaly. Upon determining that the first value is not an anomaly, the anomaly detector 145 outputs an anomaly indication indicating that the first value is not an anomaly.

The data filter 126 is operative to receive the first values of the first network parameters, one or more anomaly indications for the first values and determine whether to transmit the first values to the network prediction model 130. In some embodiments, the data filter 126 may receive a single anomaly indication for a first value and determine based on the single indication to transmit or not the first value. When the indication indicates that the first value is an anomaly, the first value is not transmitted. Alternatively, when the indication indicates that the first value is not an anomaly, the first value is transmitted.

In other embodiments, the anomaly determiner 124 includes two or more anomaly detectors. In these embodiments, the data filter 126 may determine to transmit the first value based on the anomaly indications of the multiple anomaly detectors.

In a first embodiment, the data filer 126 is operative to determine whether the first values are anomalies and transmit them to the prediction model 130. In one embodiment, the data filter 126 may determine that a first value is an anomaly by determining whether at least one of the anomaly indications received from the multiple anomaly detectors 141, 143, and 145 indicates that the first value is an anomaly. When at least one of the anomaly indications indicates that the first value is an anomaly, the data filter 126 concludes that the first value is an anomaly. Upon determining that the first value is an anomaly, the data filter 126 transmits the first value to the network prediction model 130 to be used as training data. In addition, in this first embodiment, upon determining that none of the anomaly indications indicates that the first value is an anomaly the data filter 126 concludes that the first value is not an anomaly. In other words, in this first embodiment, for the data filter 126 to determine that the first value is an anomaly it is sufficient for at least one of the anomaly detection mechanisms (e.g., one of the first, second, or third anomaly detectors) to indicate that the first value is an anomaly. Alternatively, in this first embodiment, to conclude that the first value is not an anomaly, each one of the anomaly detection mechanisms (e.g., each one of the first, second, and the third anomaly detectors) needs to indicate that the first value is not an anomaly. Upon determining that the first value is not an anomaly, the data filter 126 does not transmit the first value to the network prediction model 130 such that the first value is not used as training data. In this embodiment, the data filter may further transmit an anomaly indication and the first value to the network manager 110.

In an alternative second embodiment, the data filter can be operative to determine that a first value is an anomaly when all of the anomaly indications indicate that the first value is an anomaly. When all of the anomaly indications indicate that the first values are anomalies, the data filter 126 concludes that the first value is an anomaly and does not transmit the first value to the prediction model 130. In addition, in this second embodiment, upon determining that at least one of the anomaly indications indicates that the first value is not an anomaly, the data filter 126 concludes that the first value is not an anomaly and transmits the first value to the prediction model 130. In other words, in this second embodiment, for the data filter 126 to determine that the first value is an anomaly each one of the anomaly detection mechanisms (e.g., each one of the first, second, or third anomaly detectors) needs to indicate that the first value is an anomaly. Alternatively, in this second embodiment, to conclude that the first value is not an anomaly, it is sufficient that at least one of the anomaly detection mechanisms (e.g., at least one of the first, second, and the third anomaly detectors) indicates that the first value is not an anomaly.

While the embodiments above describe two exemplary mechanisms for determining that first values are anomalies based on anomaly indications for the first values, other mechanisms can be used to conclude when the first values are anomalies based on anomaly indicators for the first values. For example, different combinations of anomaly indicators can be used to conclude whether the first values are anomalies or not. In one example, a global anomaly metric can be determined from the sum of the anomaly metric or indicators output by each one of the anomaly detectors and this global anomaly metric can be evaluated against a threshold to determine whether the first values are anomalies or not.

The network manager 110 is operative to receive, from the data filter 126, first values of first network parameters and associated anomaly indications for the first values, where each one of the anomaly indications indicates that an associated first value from the first values is an anomaly. The first values can be determined by or received from one or multiple communication devices (e.g., communication device 140A and communication device 140N). The first values are not trusted by the network node and are determined to be anomalies based on one or more anomaly detection mechanisms implemented in the anomaly detectors 141, 143, or 145. The network manager 110 is operative to use the first values and the anomaly indication to determine one or more configuration parameters for configuring the anomaly determiner 124. In some embodiments, these operations are performed as described in greater details with reference to FIGS. 3A-B.

The embodiments described herein present a system and a method for filtering abnormal network parameter values prior to being used in training of a prediction model in a communication network. Thus, the embodiments described herein prevent the use of corrupted values during an online training phase of a network prediction model. In one embodiment, the solution presented herein filters values received as input from malicious network nodes or misconfigured network nodes by determining whether the values are anomalies based on an expected correlation between trusted values and the input values. The mechanisms presented herein causes the online prediction model to avoid being altered by corrupted training values and uses knowledge of trusted data from the network and correlations between the trusted data and the untrusted data to filter the data to use during the learning phase of the prediction model. The enclosed embodiments can be integrated in a cellular telecommunication network to enable an operator to identify malicious or defective network nodes and take action accordingly. In one exemplary scenario, the mechanisms described herein can be used during online learning in the radio network.

The operations in the flow diagrams will be described with reference to the exemplary embodiments of FIGS. 1A-B. However, it should be understood that the operations of the flow diagrams can be performed by embodiments of the invention other than those discussed with reference to FIGS. 1A-B, and the embodiments of the invention discussed with reference to FIGS. 1A-B can perform operations different than those discussed with reference to the flow diagrams.

Figure 2A:
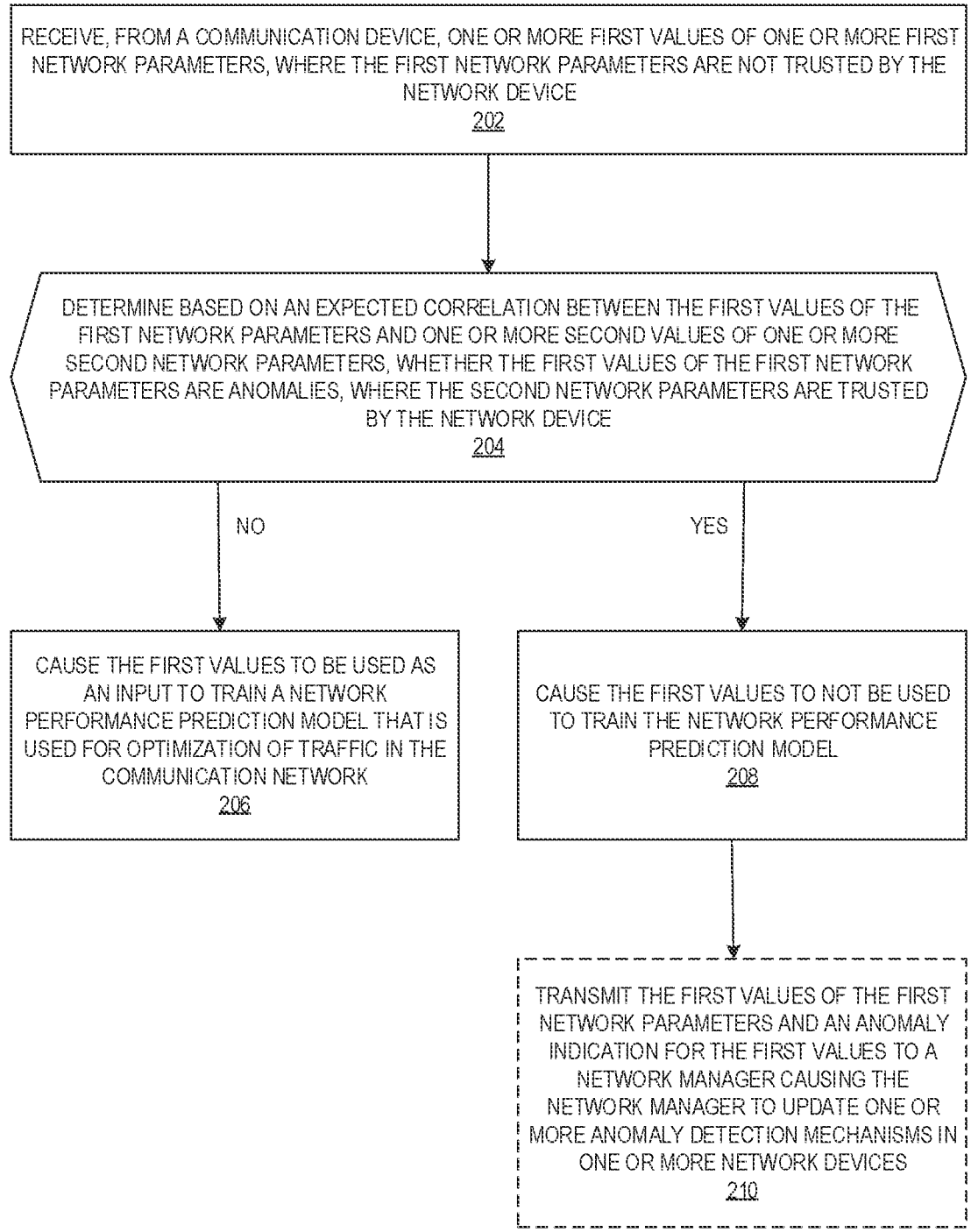
FIG. 2A illustrates a flow diagram of exemplary operations for filtering of corrupted network parameter values is performed prior to these values being used in training of a prediction model in a communication network, in accordance with some embodiments.

FIG. 2A illustrates a flow diagram of exemplary operations for filtering of corrupted network parameter values is performed prior to these values being used in training of a prediction model in a communication network, in accordance with some embodiments. The operations of FIG. 2A can be performed by a network node such as network node 120A that received untrusted values of network parameters as well as values of trusted network parameters. The network node is then operative to filter from the untrusted values any values that is determined as an anomaly and not transmit these values to a network prediction model.

At operation 202, the network node 120A receives, from a communication device (e.g., 140A), one or more first values of one or more first network parameters. The first network parameters are not trusted by the network node. The first values are intended to be used to train a prediction model.

At operation 204, the network node 120A determines whether the first values of the first network parameters are anomalies. The determination is performed based on an expected correlation between the first values of the first network parameters and one or more second values of one or more second network parameters. The second network parameters are trusted by the network node. As opposed to the first network parameters which are not trusted and can have erroneous or corrupted first values, the second network parameters are trusted by the network node. The second values of the second network parameters can provide from another network node that is different from the network node 120A (e.g., network node 121). Alternatively, the second values of the second network parameters can be determined by the network node 120A.

Responsive to determining that the first values of the first network parameters are not anomalies, the flow of operations move to operation 206, at which the network node 120A causes the first values to be used as an input to train a network prediction model (e.g., the model training unit 132 of the network prediction model 130). The network prediction model 130 is used for optimization of traffic in the communication network.

Responsive to determining that the first values of the first network parameters are anomalies the flow of operations moves to operation 208, at which the network node 120A causes the first values to not be used to train the network prediction model. In some embodiments, in addition to not using the first values to train the network prediction model, the network node 120A transmits, at operation 210, the first values of the first network parameters and an anomaly indication for the first values to a network manager (e.g., network manager 110) causing the network manager 110 to update one or more anomaly detection mechanisms in one or more network nodes. For example, the anomaly detection mechanisms can include the mechanism implemented by the first anomaly detector 141, the second anomaly detector 143, and/or the third anomaly detector 145.

FIG. 2B illustrates a flow diagram of exemplary operations for determining whether first values of first network parameters are anomalies, in accordance with some embodiments. In some embodiments, determining (operation 204) whether the first values of the first network parameters are anomalies includes performing operations 224 and 226. At operation 224, the network node 120A obtains, based on one or more anomaly detection mechanisms a respective one of one or more anomaly indications for the first values. Each one of the anomaly indications indicates whether the first values are anomalies according to the respective anomaly detection mechanism. The flow of operations then moves to operation 226, at which the network node 120A determines based on the one or more anomaly indications whether the first values are anomalies.

In a first embodiment, determining whether the first values are anomalies includes operation 228. At operation 228 the network node 120A determines whether at least one of the anomaly indications indicates that the first values are anomalies. When at least one of the anomaly indications indicates that the first values are anomalies, the network node 120A concludes that the first values are anomalies. In addition, in this first embodiment, upon determining that none of the anomaly indications indicates that the first values are anomalies, the network node 120A concludes that the first values are not anomalies. In other words, in this first embodiment, for the network node 120A to determine that the first values are anomalies it is sufficient for at least one of the anomaly detection mechanisms (e.g., one of the first, second, or third anomaly detectors) to indicate that the first values are anomalies. Alternatively, in this first embodiment, to conclude that the first values are not anomalies, each one of the anomaly detection mechanisms (e.g., each one of the first, second, and the third anomaly detectors) needs to indicate that the first values are not anomalies.

In an alternative second embodiment, determining whether the first values are anomalies includes operation 230. At operation 230, the network node 120A determines whether all of the anomaly indications indicate that the first values are anomalies. When all of the anomaly indications indicate that the first values are anomalies, the network node 120A concludes that the first values are anomalies. In addition, in this second embodiment, upon determining that at least one of the anomaly indications indicates that the first values are anomalies, the network node 120A concludes that the first values are not anomalies. In other words, in this second embodiment, for the network node 120A to determine that the first values are anomalies each one of the anomaly detection mechanisms (e.g., each one of the first, second, or third anomaly detectors) needs to indicate that the first values are anomalies. Alternatively, in this second embodiment, to conclude that the first values are not anomalies, it is sufficient that at least one of the anomaly detection mechanisms (e.g., at least one of the first, second, and the third anomaly detectors) indicates that the first values are not anomalies.

While the embodiments above describe two exemplary mechanisms for determining that first values are anomalies based on anomaly indications for the first values, other mechanisms can be used to conclude when the first values are anomalies based on anomaly indicators for the first values. For example, different combinations of anomaly indicators can be used to conclude whether the first values are anomalies or not.

Figure 2C:
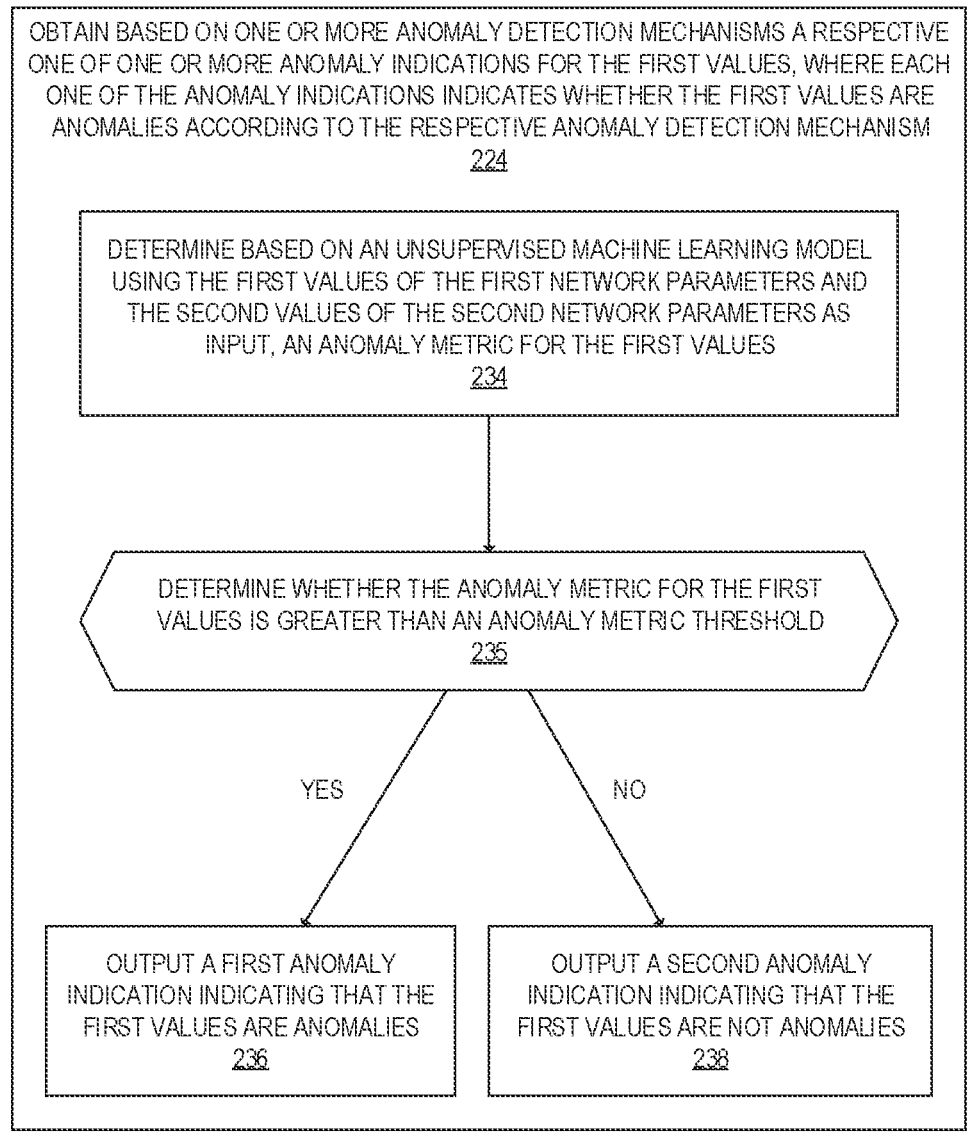
FIG. 2C illustrates a flow diagram of exemplary operations for obtaining anomaly indications for the first values, in accordance with some embodiments.

FIG. 2C illustrates a flow diagram of exemplary operations for obtaining anomaly indications for the first values, in accordance with some embodiments. In one embodiment, the anomaly indications can be obtained based on a first anomaly detection mechanism. The first anomaly detection mechanism can be implemented in the first anomaly detector 141. The first anomaly detector 141 is operative to include a prediction model of unsupervised type. In a non-limiting example, the first anomaly detector can be an auto encoder (AE) or a principal component analysis (PCA) based detector.

At operation 234, the first anomaly detector 141 determines based on an unsupervised machine learning model using the first values of the first network parameters and the second values of the second network parameters as input, an anomaly metric for the first values. At operation 235, a determination of whether the anomaly metric determined for the first values is greater than an anomaly metric threshold. When the anomaly metric for the first values is greater than the anomaly metric threshold, the flow moves to operation 236, at which a first anomaly indication indicating that the first values are anomalies is output. When the anomaly metric for the first values is smaller than the anomaly metric threshold, the flow of operations moves to operation 238, at which a second anomaly indication indicating that the first values are not anomalies is output.

Figures 2D, 2E:
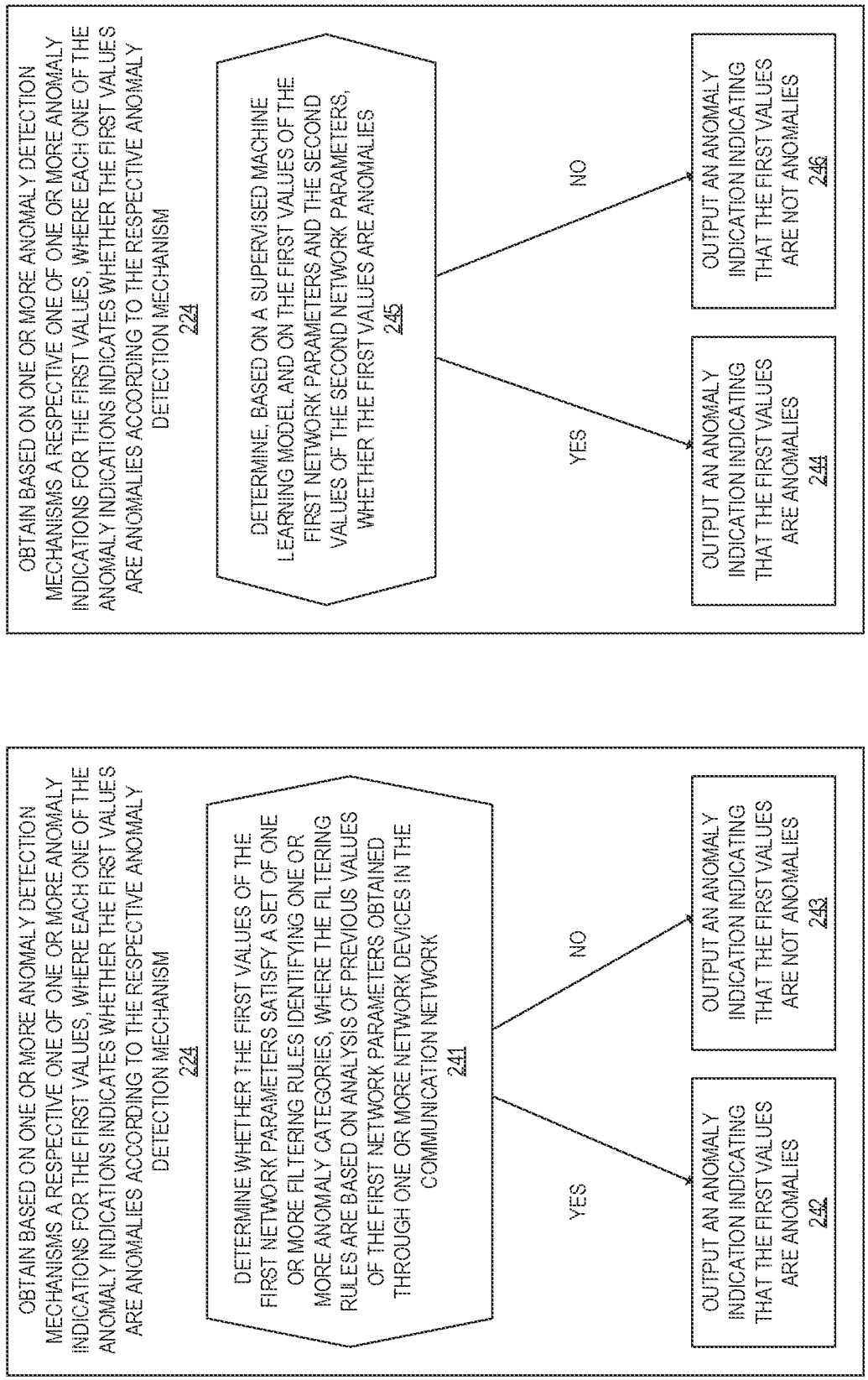
FIG. 2D illustrates a flow diagram of exemplary operations for obtaining anomaly indications for the first values, in accordance with some embodiments.
FIG. 2E illustrates a flow diagram of exemplary operations for obtaining anomaly indications for the first values, in accordance with some embodiments.

FIG. 2D illustrates a flow diagram of exemplary operations for obtaining anomaly indications for the first values, in accordance with some embodiments. In one embodiment, the anomaly indications can be obtained based on a second anomaly detection mechanism. The second anomaly detection can be implemented in the second anomaly detector 143. At operation 241, a determination of whether the first values of the first network parameters satisfy a set of one or more filtering rules is performed. The filtering rules identify anomaly categories and are based on analysis of previous values of the first network parameters obtained through one or more network devices in the communication network. Upon determining that the first values satisfy the filtering rules, the flow moves to operation 242, at which an anomaly indication indicating that the first values are anomalies is output. Upon determining that the first values do not satisfy the filtering rules, the flow moves to operation 243, at which an anomaly indication indicating that the first values are not anomalies is output.

FIG. 2E illustrates a flow diagram of exemplary operations for obtaining anomaly indications for the first values, in accordance with some embodiments. In one embodiment, the anomaly indications can be obtained based on a third anomaly detection mechanism. The third anomaly detection can be implemented in the third anomaly detector 145. At operation 245, a determination of whether the first values of the first network parameters are anomalies is performed. The determination is performed based on a supervised machine learning model and on the first values of the first network parameters and the second values of the second network parameters. Upon determining that the first values are anomalies, the flow moves to operation 244, at which an anomaly indication indicating that the first values are anomalies is output. Upon determining that the first values are anomalies, the flow moves to operation 245, at which an anomaly indication indicating that the first values are not anomalies is output.

FIGS. 2C, 2D, and 2E describe three anomaly detection mechanisms. For example, the anomaly detection mechanisms can be implemented by respective anomaly detectors. Each one of the anomaly detectors is operative to receive the first values. The anomaly detectors may further receive the second values. The anomaly detectors are then operative to determine anomaly indications for the first values. The anomaly indication indicates whether a first value of a first parameter corresponds to an abnormal behavior that does not fit within an expected standard or normal behavior.

The anomaly detectors can be configured to be used independently or in combination. In one embodiment, the anomaly detectors may be configured such that only a first anomaly detector or anomaly detection mechanism (e.g., 141, 143, or 145) is used to obtain an anomaly indication. In some other embodiments, the anomaly detectors may be configured such that two anomaly detectors (e.g., 141 and 143 or 141 and 145, etc.) can each be used to determine respective anomaly indications for first values. In another embodiment, the anomaly detectors may be configured such that all of the anomaly detectors are used to obtain respective anomaly indications. While the flow diagrams describe three anomaly detection mechanisms, in other embodiments, less or more anomaly detection mechanisms can be present and can be used to obtain less or more anomaly indications for the first values. In some embodiments, each anomaly detector can be used for detecting particular types of anomalies. The choice of the combination of anomaly detectors to use can be a tradeoff between the ability to detect several types of anomalies and implementation and computation cost. In some embodiments, the number of anomaly detectors and the selection of the anomaly detectors to be used can be input as a parameter by a user (e.g., the network operator or administrator) for tuning the sensitivity of filtering.

Figure 3A:
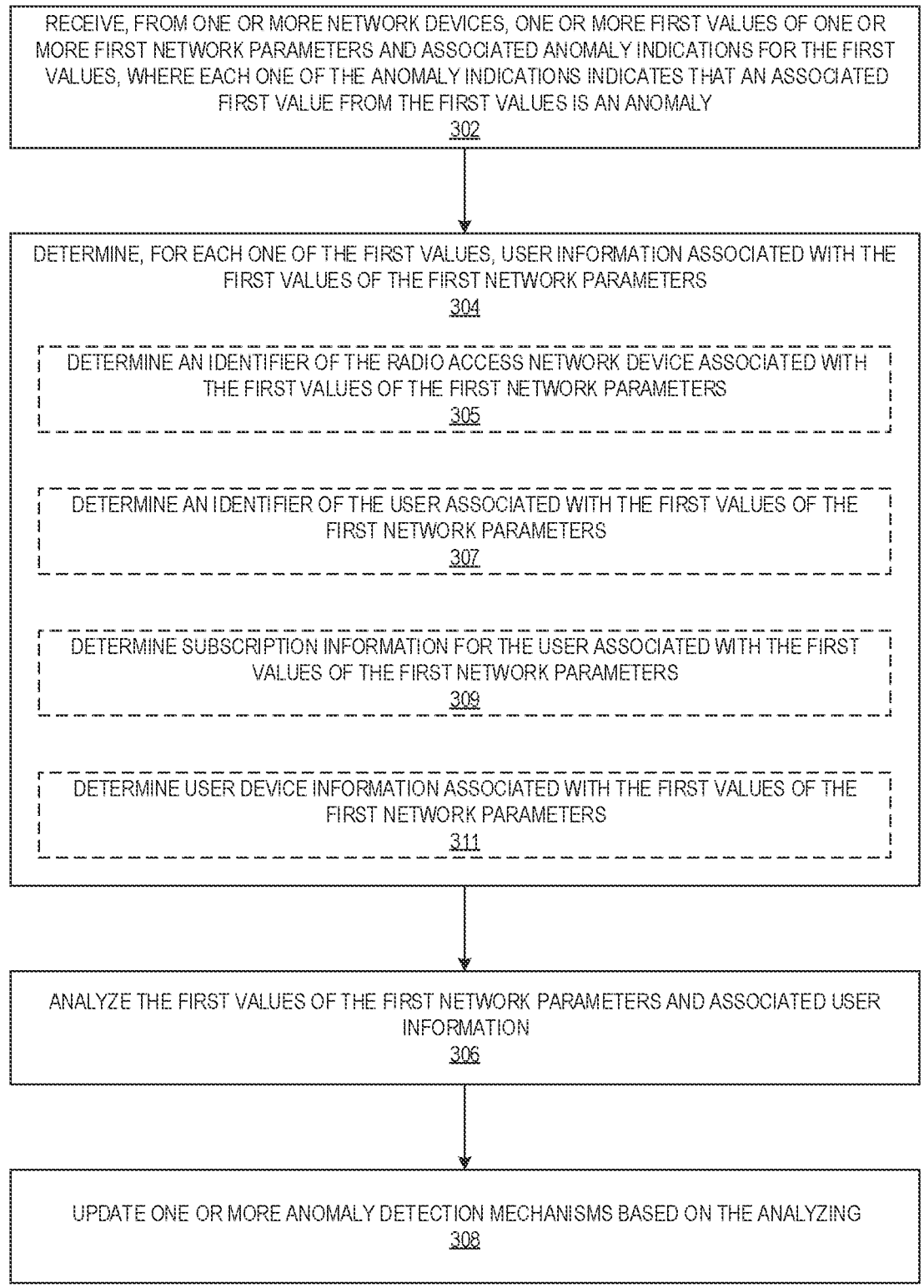
FIG. 3A illustrates a flow diagram of exemplary operations performed in a network manager for analyzing anomalies detected in a communication network, in accordance with some embodiments.

FIG. 3A illustrates a flow diagram of exemplary operations performed in a network manager for analyzing anomalies detected in a communication network, in accordance with some embodiments.

At operation 302, the network manager 110 receives, from a network device (e.g., 120A or 120K), first values of first network parameters and associated anomaly indications for the first values, where each one of the anomaly indications indicates that an associated first value from the first values is an anomaly. The first values can be determined by or received from one or multiple communication devices (e.g., communication device 140A and communication device 140N). The first values are not trusted by the network node and are determined to be anomalies based on one or more anomaly detection mechanisms at the network node as described with reference to FIGS. 2A-E.

At operation 304, the network manager 110 determines, for each one of the first values, user information associated with the first values of the first network parameters. In some embodiments, the determination of the user information includes operation 305, at which the network manager determines an identifier of the radio access network node associated with the first values of the first network parameters. For example, the anomaly is mapped to the corresponding radio component (e.g., network node 120A) that received the first values. In some embodiments, the determination of the user information can include operation 307, at which the network manager 110 determines an identifier of the user associated with the first values of the first network parameters. In a non-limiting example, the determination of the identifier of the user may include mapping a local identity of the communication device 140A to a global identity such as international mobile subscriber identity (IMSI) or Temporary Mobile Subscriber Identity (TMSI) and a device identifier international mobile equipment identity (IMEI). In some embodiments, the determination of the user information can include operation 309, at which the network manager 110 determines subscription information for the user associated with the first values of the first network parameters. The subscriber information may be requested from a subscriber database (e.g., Home Location Register (HLR)/Visitor Location Register (VLR) or other subscriber databases). In some embodiments, the determination of the user information can include operation 311, at which the network manager 110 determines at user device information associated with the first values of the first network parameters. The device identifier (e.g., IMEI) can be mapped to a device type, model type, and/or a software version.

The flow of operations then moves to operation 306, at which the network manager 110 analyzes the first values of the first network parameters and the associated user information. The identity of the network node, the subscriber, and the additional information on the communication device and subscription information is analyzed in combination with information about the anomaly.

Based on the analysis performed at operation 306, the network manager 110 updates one or more anomaly detection mechanisms. For example, the network manager 110 may determine to update one of the first anomaly detector, the second anomaly detector, and the third anomaly detector of the network node 120A.

Figure 3B:
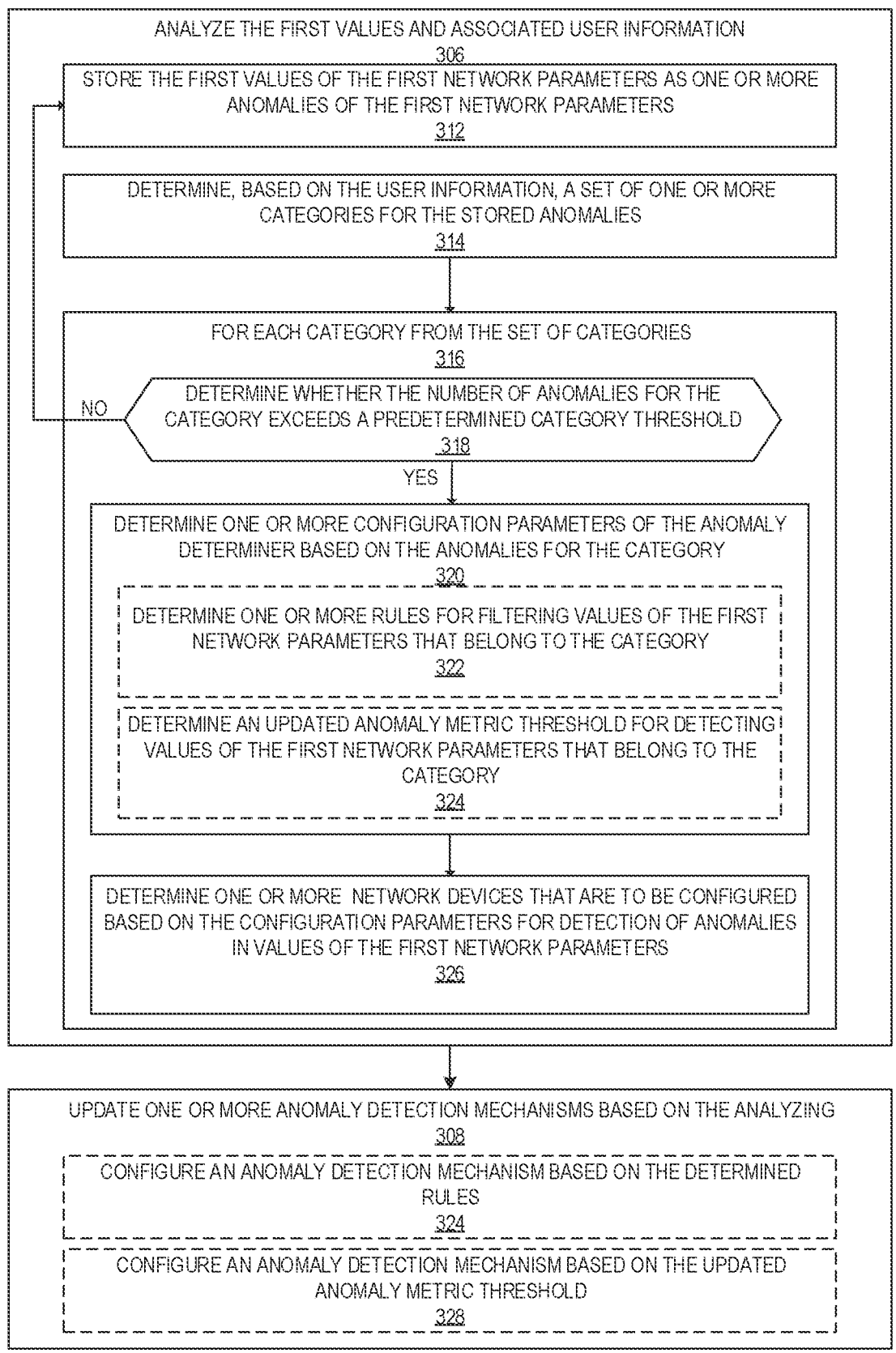
FIG. 3B illustrates a flow diagram of detailed exemplary operations performed in a network manager for analyzing anomalies detected in a communication network, in accordance with some embodiments.

FIG. 3B illustrates a flow diagram of detailed exemplary operations performed in a network manager for analyzing anomalies detected in a communication network, in accordance with some embodiments. The training data determiner manager 112 is operative to analyze the reported first values and determine whether further actions needs to be taken. The training data determiner manager 112 has a complete view of the reported anomalies for the entire network (e.g., anomaly indications received from multiple network nodes in the network) and can therefore see common patterns in the first values that are anomalies. These patterns can for instance be associated with specific network nodes (e.g., communication devices) that generate the first values, specific vendors, specific network node (e.g., communication device) model, software versions, etc. In some embodiments, the analysis, performed at operation 306, of the first values is performed based on the operations of FIG. 3B.

At operation 312, the training data determiner manager 112 stores the first values of the first network parameters that are received and indicated as anomalies detected in the network for the first parameters. At operation 314, the network manager 110 determines, based on the user information, a set of one or multiple categories for the stored anomalies. For example, the categories can include a type of software, a type of network node, a geographical location, etc.

For each category from the set of categories determined, the training data determiner manager 112 determines, at operation 318, whether the number of anomalies for the category exceeds a predetermined category threshold. If the threshold is not exceeded, the process of analyzing the anomaly feedback information is restarted and the training data determiner manager 112 continues to receive new feedback information and restart the analysis process. When the threshold is exceeded, the flow of operations moves to operation 320. At operation 320, the training data determiner manager 112 determines one or more configuration parameters of the anomaly determiner based on the anomalies for the category. For example, the training data determiner manager 112 determines one or more rules for filtering values of the first network parameters that belong to the category. The filtering rules can be used by the second anomaly detector to determine first values that are anomalies. For example, the filtering rules can be created to capture first values received from a specific communication device model with a certain software version. Different types of rules can be determined based on the feedback received.

In another example, the training data determiner manager 112 can determine an updated anomaly metric threshold for detecting values of the first network parameters that belong to the category. For example, the anomaly metric threshold used by the network node 120A in the first anomaly detector 141 can be increased or decreased if the number of reported anomalies for instance increases a lot. The anomaly metric threshold can then be used to configure the first anomaly detector.

The flow then moves to operation 326, at which the training data determiner manager 112 determines one or more network nodes that are to be configured based on the configuration parameters for detection of anomalies in values of the first network parameters. In one embodiments, the training data determiner manager 112 may determine to select a single network node to be configured based on the configuration parameter. For example, the network node 120A can be selected to receive the configuration parameter as the analysis determines that the abnormal behavior or anomaly appear to occur only at that location. In another embodiment, the training data determiner manager 112 may determine to select a group of network nodes that are to receive the configuration parameters. For example, this can be based on geographical location of the network node 120A and possibly the movement patterns of the communication device 140A such that neighboring network nodes may also need to be configured based on the same configuration parameters. In another embodiment, the training data determiner manager 112 may select all network nodes (e.g., all radio access network nodes) to receive the configuration parameters since the problem causing the anomaly is likely to cause problems in other part of the network 100.

The flow of operations then moves to operation 308, at which, the training data determiner manager 112 updates one or more anomaly detection mechanisms, e.g., anomaly detectors 141, 143, or 145, based on the result of the analysis. For example, the training data determiner manager 112 may configure an anomaly detection mechanism based on the determined filtering rules, at operation 324, and/or configure an anomaly detection mechanism based on the updated anomaly metric threshold, at operation 328.

Figure 4:
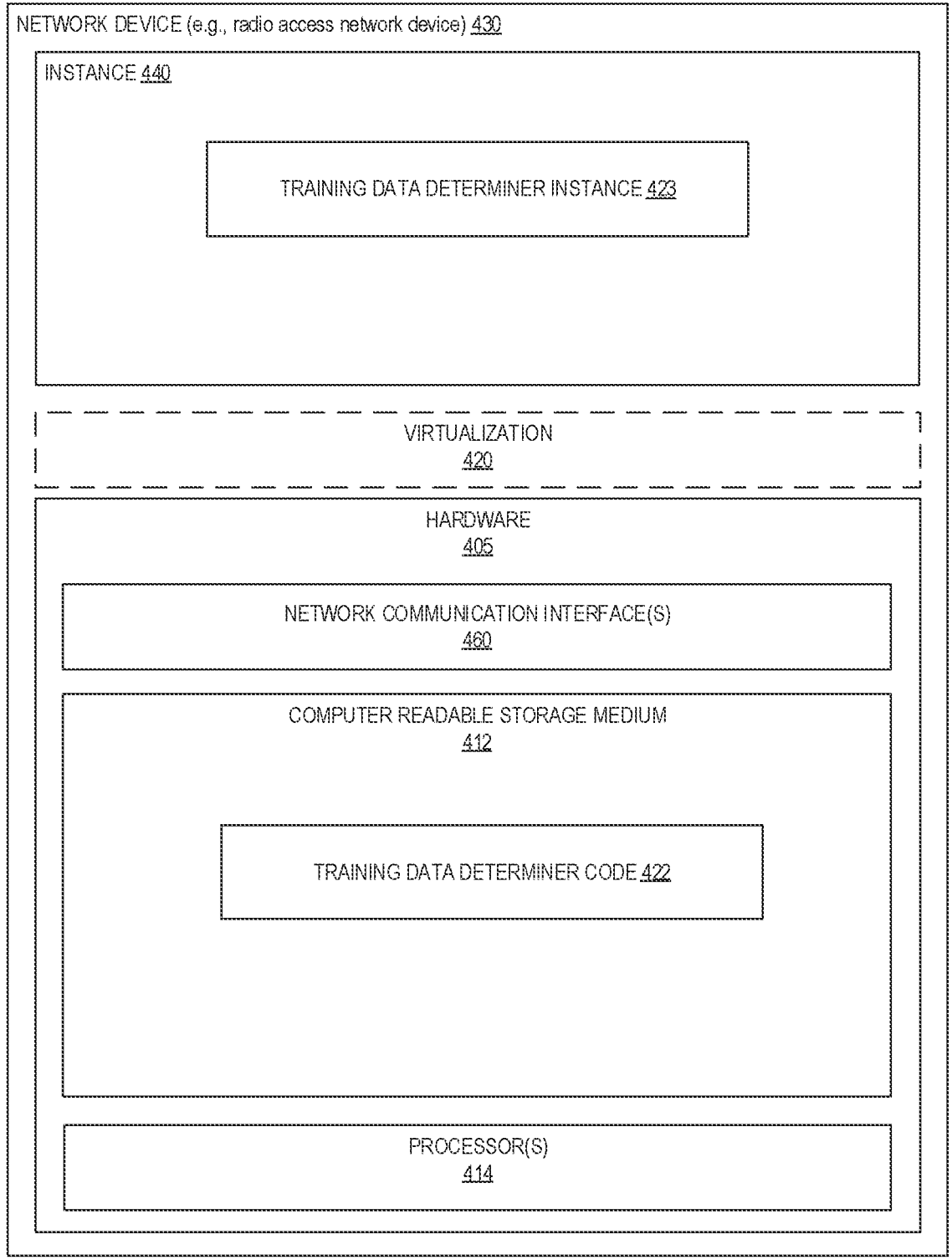
FIG. 4 illustrates a block diagram for a network device that can be used for implementing one or more of the network devices described herein, in accordance with some embodiments.

FIG. 4 illustrates a block diagram for a network device that can be used for implementing one or more of the network devices described herein, in accordance with some embodiments.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the inventive concept may be implemented using different combinations of software, firmware, and/or hardware.

As used herein, wireless device (WD) refers to a device capable, configured, arranged and/or operable to communicate wirelessly with network nodes and/or other wireless devices. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above, each one of the network nodes discussed with reference to FIG. 1A and FIG. 1B can be implemented on one ND or distributed over multiple NDs.

FIG. 4 illustrates a block diagram for a network device that can be used for implementing one or more network nodes described herein, in accordance with some embodiments. The network device 430 may be a web or cloud server, or a cluster of servers, running on server hardware. According to one embodiment, the network device is a server device which includes hardware 405. Hardware 405 includes one or more processors 414, network communication interfaces 460 coupled with a computer readable storage medium 412. The computer readable storage medium 412 may include training data determiner code 422.

Alternative embodiments of network device 430 may include additional components beyond those shown in FIG. 4 that may be responsible for providing certain aspects of the network node's functionality, including any of the functionality described herein and/or any functionality necessary to support the subject matter described herein. For example, network device 430 may include user interface equipment to allow input of information into network device 430 and to allow output of information from network device 430. This may allow a user to perform diagnostic, maintenance, repair, and other administrative functions for network device 430.

In some embodiments, the network device 430 can be a radio access network device that includes an antenna element. The antenna element may include one or more antennas, or antenna arrays, configured to send and/or receive wireless signals. The antenna element may be coupled to radio front end circuitry and may be any type of antenna capable of transmitting and receiving data and/or signals wirelessly. In some embodiments, the antenna element may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, the antenna element may be separate from network device 430 and may be connectable to network device 430 through an interface or port.

While one embodiment does not implement virtualization, alternative embodiments may use different forms of virtualization—represented by a virtualization layer 420. In these embodiments, the instance 440 and the hardware that executes it form a virtual server which is a software instance of the modules stored on the computer readable storage medium 412.

The training data determiner code 422 includes instructions which when executed by the hardware 405 causes the instance 440 to implement a training data determiner instance 423 that is operative to perform the operations performed by a network node 120A described with reference to FIGS. 1A-3B.

While the flow diagrams in the figures show a particular order of operations performed by certain embodiments of the inventive concept, it should be understood that such order is exemplary (e.g., alternative embodiments may perform the operations in a different order, combine certain operations, overlap certain operations, etc.).

While the inventive concept has been described in terms of several embodiments, those skilled in the art will recognize that the inventive concept is not limited to the embodiments described, can be practiced with modification and alteration within the spirit and scope of the appended claims. The description is thus to be regarded as illustrative instead of limiting.

What is claimed is:

1. A method in a network node in a communication network, the method comprising:
   receiving, from a communication device, one or more first values of one or more first network parameters, wherein the first network parameters are not trusted by the network node;
   determining, based on an expected correlation between the first values of the first network parameters and one or more second values of one or more second network parameters, whether the first values of the first network parameters are anomalies, wherein the second network parameters are trusted by the network node; and
   determining whether to cause the first values to be used to train a network prediction model based on whether the first values are anomalies, the network prediction model being used for optimization of traffic in the communication network.

2. The method of claim 1, wherein determining whether the first values of the first network parameters are anomalies includes:
   obtaining, based on one or more anomaly detection mechanisms, a respective one of one or more anomaly indications for the first values, each one of the anomaly indications indicating whether the first values are anomalies according to the respective anomaly detection mechanism; and
   determining, based on the one or more anomaly indications, whether the first values are anomalies.

3. The method of claim 2, wherein determining whether the first values are anomalies comprises one of:
   determining that the first values are anomalies based on at least one of the anomaly indications indicating that the first values are anomalies; and
   determining that the first values are not anomalies based on none of the anomaly indications indicating that the first values are anomalies.

4. The method of claim 2, wherein determining whether the first values are anomalies comprises one of:
   determining that the first values are anomalies based on all of the anomaly indications indicating that the first values are anomalies, and
   determining that the first values are not anomalies based on at least one of the anomaly indications indicating that the first values are not anomalies.

5. The method of claim 2, wherein obtaining, based on the one or more anomaly detection mechanisms, the respective one of one or more anomaly indications includes:
   determining, based on an unsupervised machine learning model using the first values of the first network parameters and the second values of the second network parameters as input, an anomaly metric for the first values;
   outputting one of:
      a first anomaly indication indicating that the first values are anomalies when the anomaly metric for the first values is greater than an anomaly metric threshold; and
      a second anomaly indication indicating that the first values are not anomalies when the anomaly metric for the first values is smaller than the anomaly metric threshold.

6. The method of claim 2, wherein obtaining, based on the one or more anomaly detection mechanisms, the respective one of one or more anomaly indications includes at least one of:
   outputting an anomaly indication indicating that the first values are anomalies when the first values of the first network parameters satisfied a set of one or more filtering rules identifying one or more anomaly categories, the filtering rules being based on analysis of previous values of the first network parameters obtained through one or more network nodes in the communication network; and
   outputting an anomaly indication indicating that the first values are anomalies when a supervised machine learning model determines based on the first values of the first network parameters and the second values of the second network parameters that the first values are anomalies.

7. The method of claim 1, further comprising:
   responsive to determining that the first values of the first network parameters are anomalies, transmitting the first values of the first network parameters and an anomaly indication for the first values to a network manager causing the network manager to update one or more anomaly detection mechanisms in one or more network nodes.

8. The method of claim 1, wherein the network node is a radio access network node, and
   wherein the second network parameters include one or more of a timing advance parameter that represents a length of time a signal takes to reach the radio access network node from the communication device through a radio channel between the communication device and the radio access network node, an estimation of path loss for the radio channel, and measures of activity of neighbor cells.

9. The method of claim 1, wherein the network node is a radio access network node, and
   wherein the first network parameters include an indicator of quality of a radio channel between the communication device and the radio access network node.

10. The method of claim 1, determining whether to cause the first values to be used to train the network prediction model comprises, responsive to determining that the first values of the first network parameters are not anomalies, causing the first values to be used as an input to train a network prediction model that is used for optimization of traffic in the communication network.

11. The method of claim 1, determining whether to cause the first values to be used to train the network prediction model comprises, responsive to determining that the first values of the first network parameters are anomalies, causing the first values to not be used to train the network prediction model.

12. A network node in a communication network comprising:
one or more processors; and
a computer memory storing a set of computer readable instructions that when executed by the one or more processors cause the network node to perform operations comprising:
receiving, from a communication device, one or more first values of one or more first network parameters, wherein the first network parameters are not trusted by the network node;
determining, based on an expected correlation between the first values of the first network parameters and one or more second values of one or more second network parameters, whether the first values of the first network parameters are anomalies, wherein the second network parameters are trusted by the network node; and
determining whether to cause the first values to be used to train a network prediction model based on whether the first values are anomalies, the network prediction model being used for optimization of traffic in the communication network.

13. The network node of claim 12, wherein determining whether the first values of the first network parameters are anomalies includes:
obtaining, based on one or more anomaly detection mechanisms, a respective one of one or more anomaly indications for the first values, each one of the anomaly indications indicates whether the first values are anomalies according to the respective anomaly detection mechanism; and
determining, based on the one or more anomaly indications, whether the first values are anomalies.

14. The network node of claim 13, wherein determining whether the first values are anomalies comprises one of:
determining that the first values are anomalies based on at least one of the anomaly indications indicating that the first values are anomalies, and
determining that the first values are not anomalies based on none of the anomaly indications indicating that the first values are anomalies.

15. The network node of claim 13, wherein determining whether the first values are anomalies comprises one of:
determining that the first values are anomalies based on all of the anomaly indications indicating that the first values are anomalies, and
determining that the first values are not anomalies based on at least one of the anomaly indications indicating that the first values are not anomalies.

16. The network node of claim 13, wherein obtaining based on one or more anomaly detection mechanisms a respective one of one or more anomaly indications includes:
determining based on an unsupervised machine learning model using the first values of the first network parameters and the second values of the second network parameters as input, an anomaly metric for the first values;
outputting one of:
a first anomaly indication indicating that the first values are anomalies when the anomaly metric for the first values is greater than an anomaly metric threshold; and
a second anomaly indication indicating that the first values are not anomalies when the anomaly metric for the first values is smaller than the anomaly metric threshold.

17. The network node of claim 12, wherein obtaining, based on the one or more anomaly detection mechanisms, the respective one of one or more anomaly indications includes at least one of:
outputting an anomaly indication indicating that the first values are anomalies when the first values of the first network parameters satisfied a set of one or more filtering rules identifying one or more anomaly categories, the filtering rules being based on analysis of previous values of the first network parameters obtained through one or more network nodes in the communication network; and
outputting an anomaly indication indicating that the first values of the first network parameters are anomalies when a supervised machine learning model determines based on the first values of the first network parameters and the second values of the second network parameters that the first values are anomalies.

18. The network node of claim 12, the operations further comprising:
responsive to determining that the first values of the first network parameters are anomalies, transmitting the first values of the first network parameters and an anomaly indication for the first values to a network manager causing the network manager to update one or more anomaly detection mechanisms in one or more network nodes.

19. The network node of claim 12, wherein the network node is a radio access network node, and
wherein the second network parameters include one or more of a timing advance parameter that represents a length of time a signal takes to reach the radio access network node from the communication device through a radio channel between the communication device and the radio access network node, an estimation of path loss for the radio channel, and measures of activity of neighbor cells.

20. A non-transitory computer readable medium having instructions stored therein that are executable by processing circuitry of a network node in a communication network to cause the network node to perform operations comprising:
receiving, from a communication device, one or more first values of one or more first network parameters, wherein the first network parameters are not trusted by the network node;
determining, based on an expected correlation between the first values of the first network parameters and one or more second values of one or more second network parameters, whether the first values of the first network parameters are anomalies, wherein the second network parameters are trusted by the network node; and
determining whether to cause the first values to be used to train a network prediction model based on whether the first values are anomalies, the network prediction model being used for optimization of traffic in the communication network.

* * * * *